(12) United States Patent
Turner (10) Patent No.: US 10,156,069 B1
(45) Date of Patent: Dec. 18, 2018

(54) ROOF TRUSS FOR SOLAR APPLICATION

(71) Applicant: Jeffrey G. Turner, Fort Collins, CO (US)

(72) Inventor: Jeffrey G. Turner, Fort Collins, CO (US)

( * ) Notice: Subject to any disclaimer, the term of this patent is extended or adjusted under 35 U.S.C. 154(b) by 0 days.

(21) Appl. No.: 15/699,894

(22) Filed: Sep. 8, 2017

(51) Int. Cl.
  *E04B 7/02* (2006.01)
  *E04B 7/18* (2006.01)
  *H02S 20/23* (2014.01)

(52) U.S. Cl.
  CPC .......... *E04B 7/02* (2013.01); *E04B 7/18* (2013.01); *H02S 20/23* (2014.12)

(58) Field of Classification Search
  CPC .............. E04B 7/02; E04B 7/18; H02S 20/23
  USPC ................... 52/18, 90.1, 639, 643
  See application file for complete search history.

(56) References Cited

U.S. PATENT DOCUMENTS

| | | | | |
|---|---|---|---|---|
| 1,466,174 | A | * | 8/1923 | Korn |
| 4,674,244 | A | * | 6/1987 | Francovitch |
| 5,653,067 | A | * | 8/1997 | Lago |
| 2008/0092477 | A1 | * | 4/2008 | Perrault et al. |

OTHER PUBLICATIONS

"Solar Housing" http://www.jc-solarhomes.com/CLASS/14.SolarHouse.htm.
"Chapter 6: Energy and Matter (h). Earth-Sun Geometry," http://www.physicalgeography.net/fundamentals/6h.htm.

* cited by examiner

*Primary Examiner* — Patrick J Maestri
(74) *Attorney, Agent, or Firm* — Merchant & Gould P.C.

(57) ABSTRACT

A building includes a base structure and a roof secured to the base structure. The roof structure includes a first planar portion extending from a peak to a first terminal end of the roof and pitched at a first angle relative to a horizontal axis, a second planar portion extending from the peak to a joining region and pitched at a second angle, relative to the horizontal axis, that is optimized for insolation of the second planar portion at a geographical latitude of the building and that is different than the first angle and less than about 90 degrees. The roof structure also includes a third planar portion extending from the joining region to a second terminal end of the roof and pitched at a third angle relative to the horizontal axis, and a solar collector positioned on the second planar portion.

18 Claims, 5 Drawing Sheets

ROOF TRUSS FOR SOLAR APPLICATION

FIELD

Embodiments described herein relate to roofs for buildings, and in particular to roofs with shapes that are optimized for the collection of solar energy.

BACKGROUND

Energy used by humans comes from many different sources. Fuels like wood have long been used to heat dwellings and cook food. Recently, fossil fuels have been widely used to power vehicles, heat homes, and to produce electrical energy for myriad modern technologies and conveniences. Such fuels create numerous challenges, however, as the earth may hold only a limited supply, and burning them for our energy needs may produce pollution and may contribute to climate change. However, renewable energy sources, such as solar energy, may supplement or replace fossil fuels (or other types of fuel) without the deleterious effects of those fuels.

SUMMARY

A building includes a base structure and a roof secured to the base structure. The roof includes a first planar portion extending from a peak to a first terminal end of the roof and pitched at a first angle relative to a horizontal axis and a second planar portion extending from the peak to a joining region and pitched at a second angle, relative to the horizontal axis, that is optimized for insolation of the second planar portion at a geographical latitude of the building and that is different than the first angle and less than about 90 degrees. The roof also include a third planar portion extending from the joining region to a second terminal end of the roof and pitched at a third angle relative to the horizontal axis. The building also includes a solar collector positioned on the second planar portion.

The second angle may be equal to the geographical latitude of the building. The peak may be substantially parallel with a line defining the geographical latitude of the building.

The solar collector may be oriented substantially parallel to the second planar portion. The solar collector may be a photovoltaic panel. The solar collector may be a solar thermal collector.

The roof may include a group of trusses, each truss comprising a first top chord corresponding to the first planar portion, a second top chord corresponding to the second planar portion, a third top chord corresponding to the third planar portion, and a bottom chord extending from a distal region of the first top chord to a distal region of the third top chord.

A roof truss includes a first top chord configured to support a first roof portion and extending, from a peak of the roof truss, at a first angle relative to a horizontal axis, a second top chord configured to support a second roof portion and extending, from the peak of the roof truss, at a second angle relative to the horizontal axis that is different from the first angle and less than about 90 degrees, and a third top chord configured to support a third roof portion and extending from the second top chord at a third angle relative to the horizontal axis. The second angle may be configured to optimize insolation of the second roof portion at a particular geographical latitude of installation. The second angle may be substantially equal to the geographical latitude of installation plus or minus 5 degrees.

The second angle may be substantially equal to the geographical latitude of installation. A first length from a terminal end of the first top chord to the peak may be substantially equal to a second length from a terminal end of the third top chord to the peak. A first length from a terminal end of the first top chord to the peak may be different than a second length from a terminal end of the third top chord to the peak.

The roof truss may include a bottom chord extending from a distal region of the first top chord to a distal region of the third top chord, and the second top chord may extend from the peak to the bottom chord and is connected to the bottom chord.

A roof truss includes a first top chord on a first side of a peak and having a first pitch, a second top chord on a second side of the peak and having a non-vertical second pitch that is different from the first pitch, and a third top chord on the second side of the peak and having a third pitch that is different from the second pitch. The first pitch and the third pitch may be substantially equal. The first, second, and third top chords may be formed from wood.

The non-vertical second pitch may be characterized by an angle that is substantially equal to a geographical latitude of installation of the roof truss. The first top chord and the second top chord may join at a peak of the roof truss, and the roof truss may further include a bottom chord and a king post extending from the peak of the roof truss to the bottom chord.

The second top chord may at least partially define a first exterior roof segment having a first length, and the third top chord may at least partially define a second exterior roof segment having a second length that is at least twice as long as the first exterior roof segment.

The roof truss may define part of a roof of a building that is located at a particular geographical latitude, and the second pitch may be selected, based on the geographical latitude, to maximize insolation of a roof segment supported by the second top chord.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Fuels used for the energy needs of modern society may have numerous negative consequences. For example, the burning of fossil fuels in power plants, vehicles, and the like may release chemicals that contribute to climate change and air pollution, and may otherwise negatively affect the health and well-being of individuals and society as a whole. Fossil fuels may also be a limited resource, and as such may not be a suitable long-term solution for the world's increasing energy needs. Renewable energies, on the other hand, may provide a limitless supply of clean energy that addresses these and other consequences of fossil fuel use. For example, solar energy, whether captured using photovoltaic or thermal collection techniques, will be available as long as the sun is shining.

While solar energy is plentiful, the ability to collect solar energy and convert it to an energy supply that is useful to people is a limiting factor in the adoption and use of solar energy. For example, as sunlight is only available for part of the day, it is necessary to store collected solar energy for use during night time hours. Further, because the sun changes its position in the sky throughout the day and throughout the year, solar collectors that do not physically track the sun may not be able to operate at their optimum efficiency at all times.

One common way of collecting solar energy is to mount solar collectors (e.g., photovoltaic panels or solar thermal collectors) on the roof of a building. In order to maximize the efficiency of the solar collectors, the solar collectors may need to be positioned at a particular angle. For example, solar collectors may be most efficient when they are substantially perpendicular to the sun at a particular time of day (and particular day of the year). However, the roofs of existing buildings may not have the correct angle or orientation for the maximum efficiency. Accordingly, simply mounting solar collectors (which are generally flat) directly against (e.g., parallel to) the roof may be suboptimal. Moreover, when new houses are being built, roofs may not be oriented or shaped to optimize solar collection.

In order to optimize the orientation (e.g., angle) of solar collectors, they may be mounted on brackets or other structures that are attached to a roof of a building. While roof-mounted brackets or racking can be used to position solar collectors in a desired orientation, such brackets may be large and heavy, and some roofs may be unable to support the added weight or wind loading produced by such structures. Moreover, bracket-mounted solar collectors may be unsightly and may violate laws, regulations, building codes, or be restricted by homeowners associations.

Accordingly, described herein is a roof and roof truss design that is optimized for the collection of solar energy. In particular, as described herein, a roof may have a complex shape with at least one segment that is at an optimum angle for solar energy collection. Because the segment of the roof is at an optimum angle for solar collection, solar collectors may be mounted on the roof substantially parallel to the roof, obviating the need for brackets or other mounting structures to support the collectors at an oblique angle to the roof. And while specific examples of roofs and roof trusses are described, the instant application also describes an optimization technique that may be applied to roofs and trusses of various shapes and configurations, thus allowing for variations in overall roof shape and appearance while still providing optimized solar performance.

Figure 1:
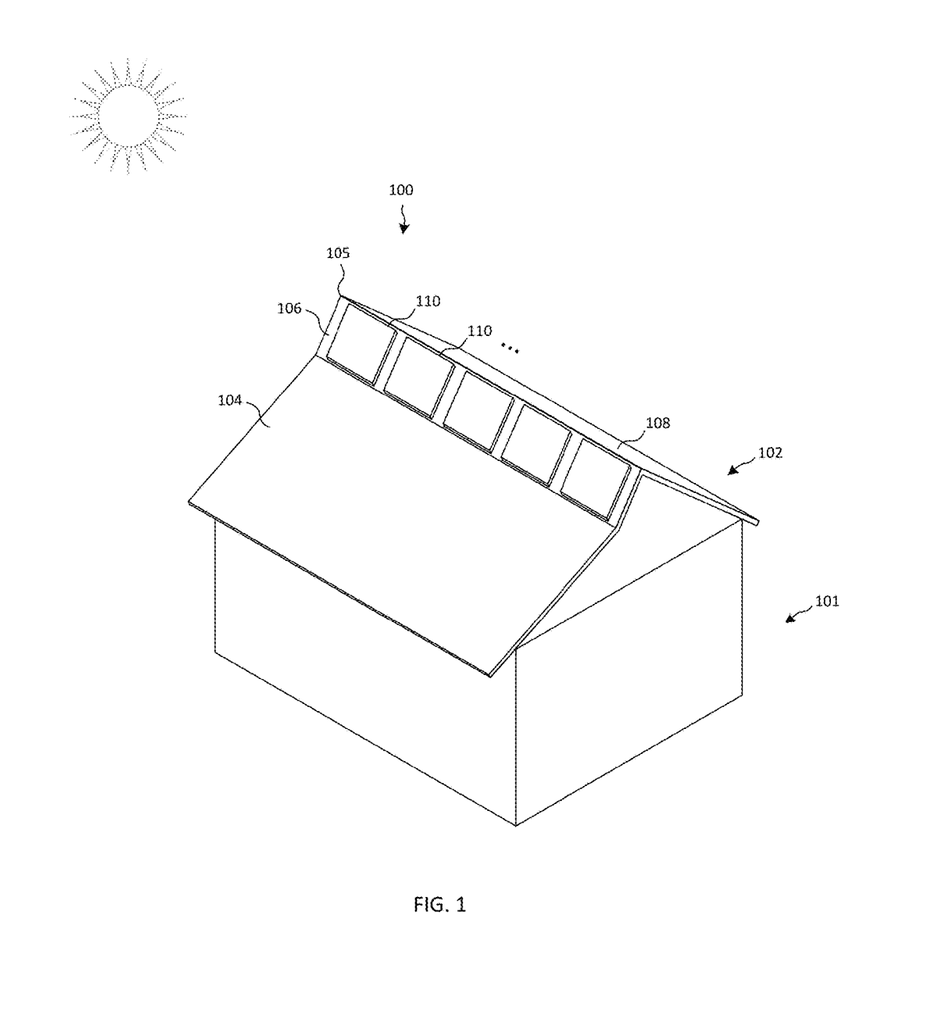
FIG. 1 depicts an example building that includes a roof structure.

FIG. 1 depicts an example building 100 that includes a roof having a substantially planar segment or portion that has an orientation that is optimized for solar energy collection. In particular, the building 100 includes a base structure 101 that supports a roof 102. The base structure 101 may be any suitable building or roof-supporting structure, and may have any size and shape. For example, the base structure 101 may be a structure enclosed by external walls (e.g., resembling a building or dwelling, as represented in FIG. 1), or it may be an open structure that is not fully enclosed (e.g., a roof-support structure with supporting posts but without walls around the entire perimeter). Moreover, the building 100, and thus the base structure 101, may be used for any function or purpose. For example, the building 100 be a house as depicted in FIG. 1, or it may be a cabin, apartment building (e.g., a multi-unit dwelling), hotel, office building, retail building, barn, parking lot cover, or any other suitable structure.

The building also includes a roof 102 that is secured to the base structure 101. The roof 102 may include several portions or segments that define the exterior surface of the roof 102. For example, the roof 102 may include a first portion 104, a second portion 106, and a third portion 108. The first portion 104 may join or abut the second portion 106 at a peak 105 of the roof 102, and the third portion 108 may join or abut the second portion 106 at a joining region 116. Each of the first, second, and third portions may be substantially planar, and may be supported and/or defined by an underlying roof truss, as described herein.

The building 100 may include solar collectors 110 mounted to the second portion 106. The solar collectors 110 may use any suitable solar collecting technology or technique. For example, the solar collectors 110 may be photovoltaic panels or solar thermal collectors (e.g., a series of tubes carrying water or another suitable heat-collecting medium). In some cases, the solar collectors may be windows, skylights, light pipes, or other structures that transmit, channel, concentrate, or direct solar radiation into the building 100 (and/or onto a solar energy collector or heating target).

The second portion 106 may be characterized by an angle that is optimized for insolation (e.g., the amount of solar radiation that is incident on the solar collectors 110). For example, the pitch or angle of the second portion 106 may be selected to maximize the amount of solar radiation that is incident on the solar collectors 110 over a typical year. In some cases, the optimum angle for insolation (and thus for the second portion 106 of the roof) is approximately equal to the geographical latitude of the location of the building 100. For example, if the building 100 is built at 39° North latitude, the angle of the second portion 106 of the roof may be 39° (±about 5°). As another example, if the building 100 is built at 51° North latitude, the angle of the second portion 106 of the roof may be 51° (±about 5°). (All angles herein are relative to a horizontal or level axis, unless otherwise stated or unless it is clear from the context that a different reference axis is intended.)

Various other optimizations may also be used to select the angle of the second portion 106. In some cases, it may be desirable to optimize insolation of the solar collectors 110 only for part of the year. For example, if solar collectors 110 are primarily intended to provide electrical power for air conditioning during the summer months, the angle may be optimized for insolation only during the summer months. This may result in a different optimum angle than one that is optimized for the entire year, as the sun may be higher in the sky in summer (at latitudes north of the equator), and the second portion 106 can therefore be angled higher than the latitude to take advantage of the higher position of the summer sun (even though it may be detrimental to solar collection during the winter). On the other hand, if solar power is being used to provide electrical heating during winter months (and electrical demands are lower during the summer), the optimum angle for the second portion 106 may be less than the latitude of the building, as the sun is lower in the sky, on average, during winter. Other considerations may also be used to determine the optimum angle for the second portion 106, including but not limited to the efficiency of the solar collectors, expected snow cover during the winter, geographical or natural features surrounding the building (e.g., trees, mountains that change the effective or apparent height of the horizon, other buildings, or the like), the type of solar collector, the purpose or end-use of the energy being collected by the solar collectors, the direction the roof, or the like.

Figure 2:
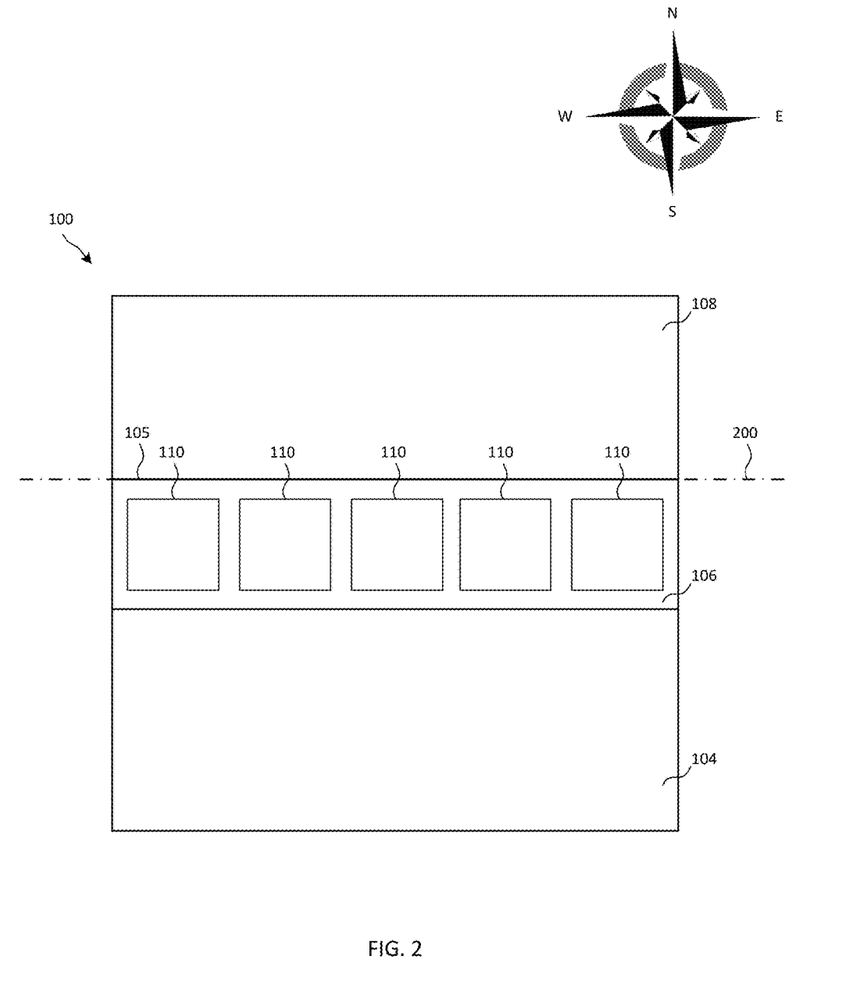
FIG. 2 depicts a top view of the example building of FIG. 1.

The orientation of the roof 102, and in particular the second portion 106 of the roof 102, may also affect the insolation of the solar collectors 110. FIG. 2 shows a top view of the building 100 along with a compass indicating cardinal directions of the location of the building 100. As shown, the second portion 106 of the roof 102 is facing directly South. If the building is located in the Northern hemisphere, the sun is always in the Southern sky. As such, positioning the building 100, or at least the roof 102, so that the second portion 106 faces directly South may result in the highest insolation values. In this orientation, the peak 105 of the roof 102 may extend along a West-East direction. Stated another way, the peak 105 of the roof 102 may be substantially parallel to a geographical latitude 200 of the building 100.

As illustrated in FIGS. 1 and 2, the configuration of the roof 102, and in particular the position and angle of the second portion 106, allows the solar collectors 110 to be mounted parallel to the roof 102. This configuration may eliminate the need for brackets or other supporting structures that position solar collectors oblique to the underlying roof portion, which may have several benefits. For example, the installation cost and time of solar collectors 110 may be less, as there is no need for the additional, complex, expensive supporting or rack structures. Moreover, the wind and weight loading on the roof may be reduced, as the additional supporting structures can be eliminated. Further, with a traditional non-optimized roof, the decision to forgo supporting structures may result in suboptimal positioning of the solar collectors. Thus, an owner or builder of a home or building has to trade solar collection efficiency or effectiveness for short-term economic benefits. The solar optimized roof and truss as described herein may eliminate that trade-off, allowing for maximum solar collection while reducing cost (and while avoiding other detrimental effects of angled collector supports).

Figure 3A:
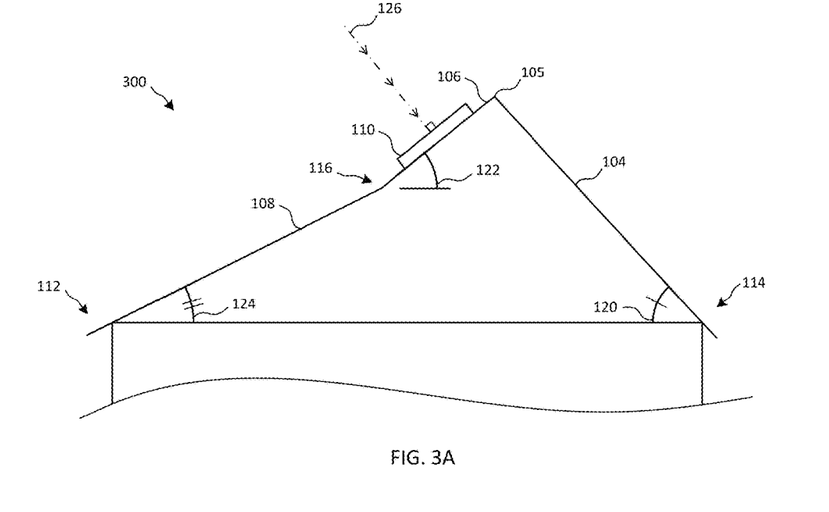
FIGS. 3A-3D depict side views of example roof structures.
Figure 3B:
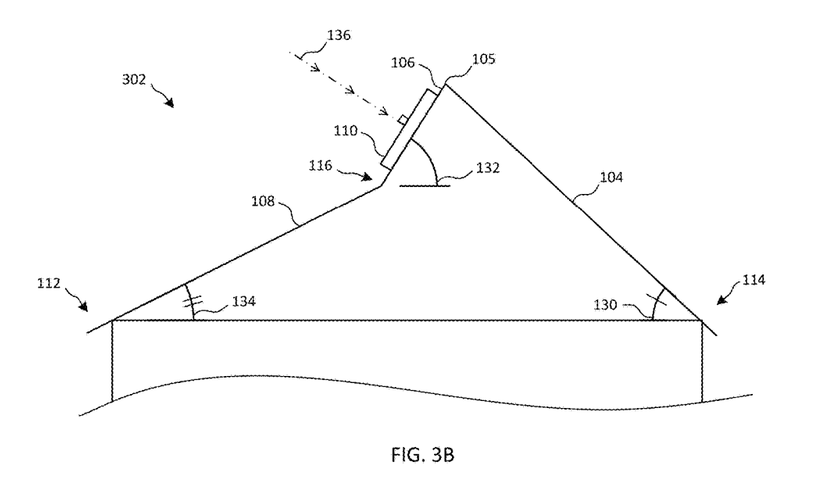
Figure 3C:
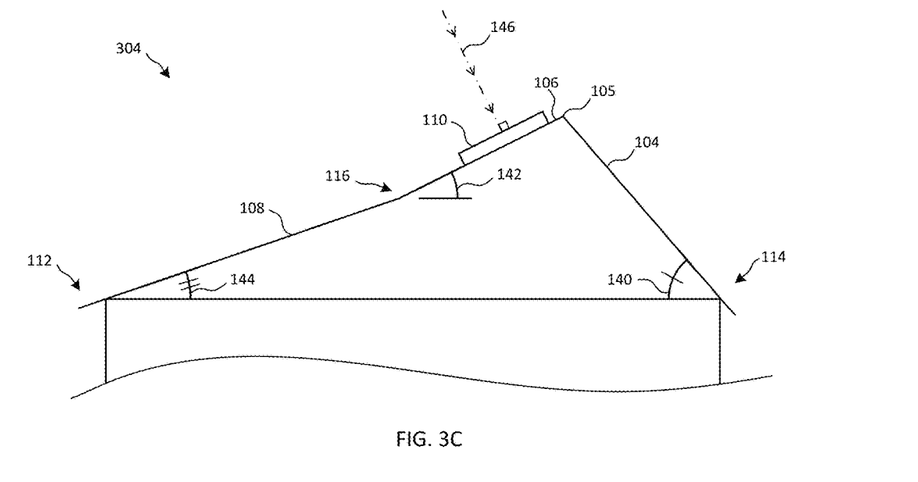

Because the roof 102 may be optimized for a particular geographical location of installation (and in particular, the geographical latitude), the exact shape of the roof, including the relative angles of the first, second, and third portions, may vary for different roofs. FIGS. 3A-3C show three different example roof configurations for installation at three different latitudes. In each case, the second portion 106 of the roof includes the solar collectors 110, and is oriented at a different angle relative to a horizontal or level axis.

FIG. 3A, for example, shows a side view of one configuration of a roof 300. (The roof 300 substantially corresponds to the roof 102, and as such similar terminology is used to describe the components and configuration of the roof 300). The roof 300 includes a first portion 104, which is substantially planar and extends from a peak 105 to a first terminal end 114 of the roof 300. The first portion 104 is pitched at a first angle 120 relative to a horizontal axis. The roof 300 also includes a second portion 106, which is also substantially planar, and which extends from the peak 105 to a joining region 116. The second portion 106 is pitched at a second angle 122 relative to the horizontal axis. The roof 300 also includes a third portion 108, which extends from the joining region 116 to a second terminal end 112 of the roof 300. The third portion 108 may be pitched at a third angle 124 relative to the horizontal axis. The second and third portions 106, 108 may form a concave or inwardly-angled profile at the joining region 116, as shown in the instant figures. In other embodiments, the second and third portions 106, 108 may form a convex or outwardly-angled profile at the joining region 116. The particular configuration of this angle (e.g., whether it is convex or concave) may depend on any suitable factor, such as solar optimization, aesthetics, attic or upper floor shape and/or size, target lengths of the second and third portions, roof height, or the like.

As noted above and described herein, the second angle 122 may be optimized for insolation of the second portion 106 at a geographical latitude of the building. The second angle 122 may also be different than the first angle 120, and less than about 90° (e.g., the second portion 106 may be non-vertical). The freedom to position the second portion 106 at an angle (or pitch) different than the angle (or pitch) of the first portion 104 allows the roof to be optimized for insolation in a way that may not be achievable if both angles are held equal. For example, a very steep angle (e.g., 70°, for a building located at 70° N latitude) for the second portion 106, which may be required at some latitudes for optimum insolation, may not be suitable for the first portion 104, as the resulting roof may be excessively tall, unsightly, and/or expensive.

Moreover, once the second angle 122 (defining the angle of the second portion 106 and thus the solar collectors 110) is determined or selected for a particular roof, the dimensions of the first and third portions 104, 108 may be modified or selected to achieve other target roof dimensions. For example, once the second angle 122 and the size of the second portion 106 is selected (e.g., the length of the line defining the second portion 106 in FIG. 3A), the length and pitches of the first and third portions 104, 108 may be selected in order to produce a roof having a desired size and/or shape (e.g., a desired span and height). For example, in some embodiments, the third portion 108 may be about twice the length of the second portion 106. In other embodiments, the third portion 108 may be substantially the same length as the second portion 106. Other configurations and shapes are also contemplated.

The shape of the roof 300, and in particular the three-plane design shown herein, allows a high degree of flexibility in the overall roof design, while also having a portion that is optimized for solar energy collection. Other roof designs, such as a symmetrical two-plane roof design, may impose constraints that force an owner or builder to compromise on certain design considerations, such as appearance, solar efficiency, height, or the like. For example, for a building of a given footprint, selecting a pitch on one side of a symmetrical, two-plane roof to optimize insolation at a high northerly latitude may result in a roof that is too tall to be economically or structurally feasible.

FIG. 3A illustrates one particular configuration of a roof 300 where the second portion 106 has an angle that is optimized for insolation. In this particular example, the angle 122 of the second portion 106 may be configured so that the plane defined by the second portion 106 is substantially perpendicular to the sun at 12:00 PM on the vernal and/or autumnal equinox at the geographic latitude at which the roof 300 is to be installed. The path of the sunlight at this time and date may be represented by the path 126 in FIG.

3A. This positioning may produce the maximum average insolation over the entire year. Due to the relative positions of the earth and the sun, a plane that is perpendicular to the sun at noon on an equinox may be substantially the same as the geographical latitude at which the roof is installed. Thus, if the roof 300 in FIG. 3A is at a geographical latitude of 39° N, the second angle 122 may be about 39° (±5°). The first and third angles 120, 124 may be different than the second angle 122. For example, as the roof portions defined by those angles might not have solar collectors attached thereto, those angles may be different than the second angle 122 to allow for various different roof shapes and sizes. In some cases, the first and third angles 120, 124 are substantially the same, while in other cases they are different.

FIG. 3B shows another example configuration of a roof 302, where the roof 302 is at a different latitude than the roof 300 shown in FIG. 3A. (The roof 302 substantially corresponds to the roof 102, and as such similar terminology is used to describe the components and configuration of the roof 302). In particular, in FIG. 3B, the roof 302 is installed at a more northerly latitude than the roof 300 in FIG. 3A. Nevertheless, the roof 302 has a similar overall appearance as the roof 300. For example, the roof 302 includes a first planar portion 104 extending from the peak 105 to a first terminal end of the roof and pitched at an angle 130. The roof 302 also includes a second planar portion extending from the peak 105 to the joining region 116 and pitched at an angle 132. The angle 132 may be different than the angle 130, and less than about 90°. The roof 302 also includes a third planar portion 108 that extends from the joining region 116 to a second terminal end of the roof and pitched at a third angle 134. As noted above, the first and third angles 130, 134 may be substantially equal, or they may be different. The particular values of these angles may depend on the desired shape, height, and span of the roof (among other possible factors and constraints).

Like the angle 122 in FIG. 3A, the angle 132 is selected so that the second portion 106 is substantially perpendicular to the sun at noon on an equinox (with the angle to the sun represented by the path 136), which may be substantially equal to the geographical latitude at which the roof 302 is installed. Thus, if the roof 302 is installed at about 57° N, the angle 132 may be approximately 57° (±5°).

FIG. 3C shows another example configuration of a roof 304, where the roof 304 is at a different latitude than the roofs 300, 302 shown in FIGS. 3A-3B. (The roof 304 substantially corresponds to the roof 102, and as such similar terminology is used to describe the components and configuration of the roof 304). In particular, in FIG. 3C, the roof 304 is installed at a more southerly latitude than the roofs 300, 302. Nevertheless, the roof 304 has a similar overall appearance as the roofs 300, 302. For example, the roof 304 includes a first planar portion 104 extending from the peak 105 to a first terminal end of the roof and pitched at an angle 140. The roof 304 also includes a second planar portion extending from the peak 105 to the joining region 116 and pitched at an angle 142. The angle 142 may be different than the angle 140, and less than about 90°. The roof 304 also includes a third planar portion 108 that extends from the joining region 116 to a second terminal end of the roof and pitched at a third angle 144. As noted above, the first and third angles 140, 144 may be substantially equal, or they may be different. The particular values of these angles may depend on the desired shape, height, and span of the roof (among other possible factors and constraints).

Like the angles 122, 132, the angle 142 is selected so that the second portion 106 is substantially perpendicular to the sun at noon on an equinox (with the angle to the sun represented by the path 146), which may be substantially equal to the geographical latitude at which the roof 304 is installed. Thus, if the roof 304 is installed at about 24° N, the angle 142 may be approximately 24° (±5°).

Figure 3D:
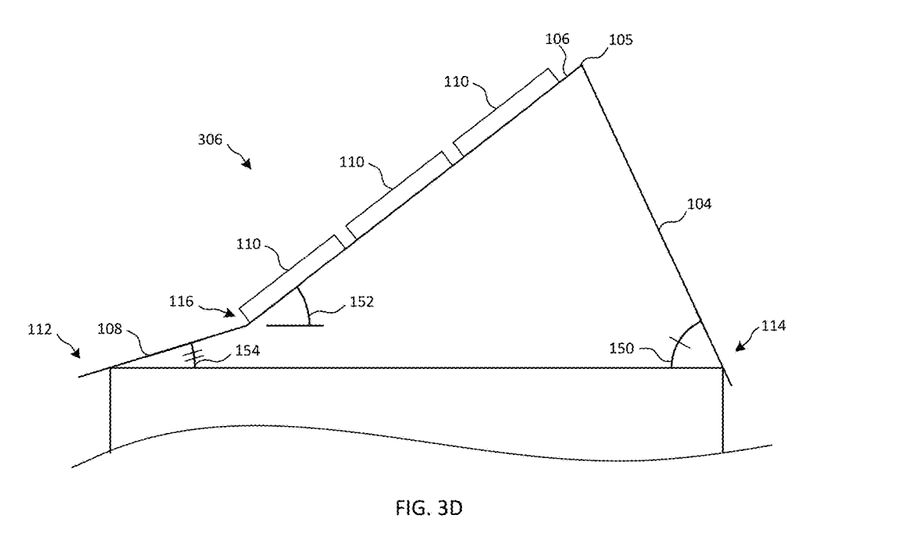

FIG. 3D shows another example configuration of a roof 306, where the planar portions of the roof 306 have relatively different sizes than those shown in FIGS. 3A-3C. This further illustrates how a roof may be optimized for solar collection while having a different general appearance and/or structure based on other engineering considerations. For example, the second portion 106 may take up a larger proportion of the roof 306 than the third portion 108. This may be done for any number of reasons, including but not limited to achieving a desired roof height, desired aesthetics, or a desired area for solar collectors 110. For example, as shown in FIG. 3D, the second portion 106 may be substantially longer than the second portions 106 shown in FIGS. 3A-3C, allowing for the installation of more solar collectors 110. While FIG. 3D shows three rows of solar collectors 110, this is merely one example arrangement, and more or fewer rows may be used. For example, in some cases, only a single row of solar collectors 110 may be installed. In other cases, combinations of different types of solar collectors may be used, such as one row of photovoltaic solar collectors, one row of solar thermal collectors, and one row of skylights.

Other aspects of the roof 306 may be similar to the roofs shown in FIGS. 3A-3C. For example, the roof 306 includes a first planar portion 104 extending from the peak 105 to a first terminal end of the roof and pitched at an angle 150. The roof 306 also includes a second planar portion extending from the peak 105 to the joining region 116 and pitched at an angle 152. The angle 152 may be different than the angle 150, and less than about 90°. The roof 306 also includes a third planar portion 108 that extends from the joining region 116 to a second terminal end of the roof and pitched at a third angle 154. As noted above, the first and third angles 150, 154 may be substantially equal, or they may be different. The particular values of these angles may depend on the desired shape, height, and span of the roof (among other possible factors and constraints).

Like the angles 122, 132, and 142 the angle 152 is selected so that the second portion 106 is substantially perpendicular to the sun at noon on an equinox, which may be substantially equal to the geographical latitude at which the roof 306 is installed.

FIGS. 3A-3D illustrate various example roof configurations that include a planar segment, between the terminal ends of the roof, that is optimized for insolation. As noted above, apart from the angle of the second portion being selected based on the geographical latitude of the installation location of the roof itself, dimensions and configurations of other roof portions may be selected based on other considerations. For example, the length or pitch of the first and third portions 104, 108, the overall length or span of the roof, the overall height of the roof, or the like, may all be selected to suit different needs or design targets. Moreover, while the instant application relates to geographical locations in the northern hemisphere, the same or similar concepts apply by analogy to locations in the southern hemisphere. In roofs that are to be installed in the southern hemisphere, however, the portion of the roof that is optimized for insolation should be facing North rather than South.

As noted above, a roof having the solar-optimized configuration described herein (e.g., the asymmetrical 3-plane roof design) may be supported by a group of roof trusses that define the exterior shape of the roof. (Example roof trusses that may define the exterior shape of the roof and support the roof are described herein). By designing and assembling the trusses according to the optimization technique described herein, solar-optimized roofs may be built quickly, easily, and cheaply, as compared to other more costly architectures and building techniques. Further, existing truss manufacturing facilities and machinery may be leveraged to produce such trusses on a large scale.

Figure 4A:
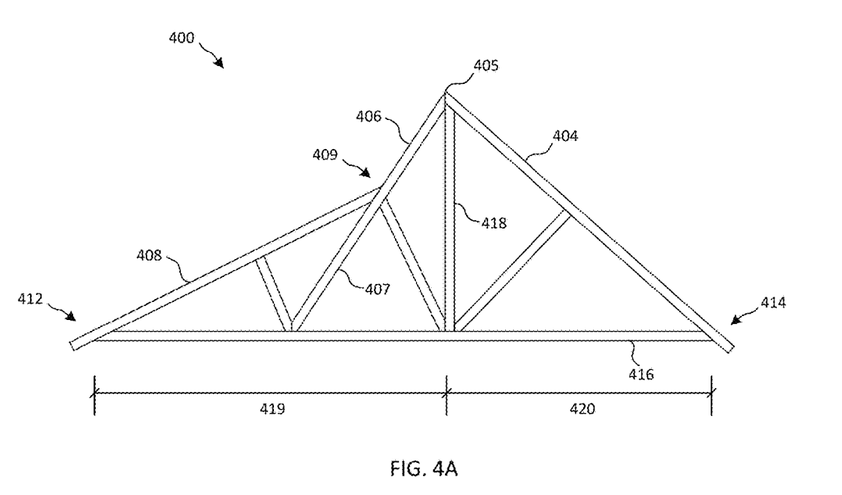
FIGS. 4A-4B depict example roof trusses.
Figure 4B:
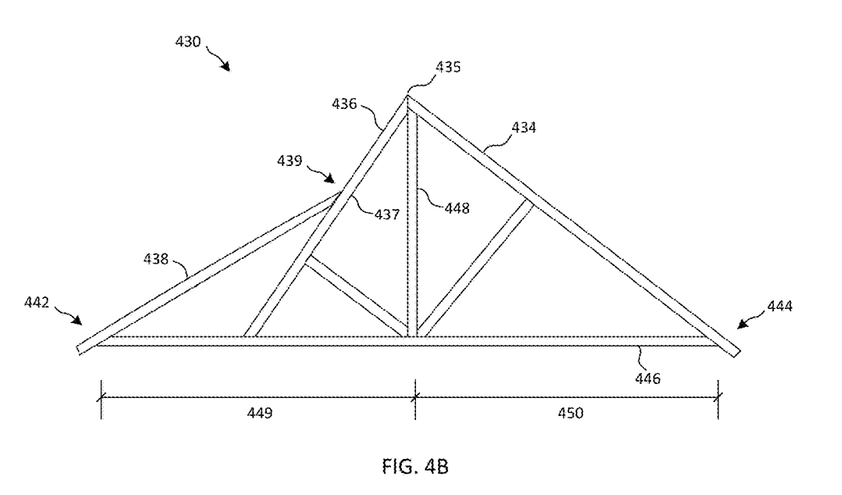

FIGS. 4A-4B illustrate two example roof trusses that may exemplify the unique roof shape and solar-optimized configuration described herein. The roof trusses in FIGS. 4A-4B also illustrate how the overall shape of the truss may be varied, despite having the same angle for the solar-optimized portions. In particular, the trusses in FIGS. 4A-4B may be configured and optimized for installation at the same geographical latitude, but may have different overall shapes.

FIG. 4A shows a truss 400 that includes a first top chord 404 (which may correspond to and/or define the first portion 104 of the roofs described above). The first top chord 404 may extend from a peak 405 of the roof truss (corresponding to and/or defining the peak 105) to a first distal region 414 of the truss 400. The first top chord 404 may extend at a first angle relative to a horizontal axis. The angles of the chords of the trusses may be substantially the same as the angles of the roofs described above, as the chords themselves essentially define the angles of the roof surfaces. Accordingly, for clarity and to avoid repetition, the angles will not be separately identified and discussed with respect to the trusses.

The truss 400 also includes a second top chord 406 (which may correspond to and/or define the second portion 106 of the roofs described above). The second top chord 406 may extend from the peak 405 at a second angle relative to the horizontal axis. The second angle (and thus the pitch of the second top chord 406) may be less than about 90° and different from the first angle (and thus different than the pitch of the first top chord 404). Moreover, as described above, the second angle (and thus the pitch of the second top chord 406) may be selected to optimize the insolation of the portion of the roof defined by the second top chord 406 at a particular geographical latitude of installation of the roof truss 400.

The truss 400 also includes a third top chord 408 (which may correspond to and/or define the third portion 108 of the roofs described above). The third top chord 408 may extend from the second top chord 406 (e.g., from a joining region of the second top chord 406), at a third angle relative to the horizontal axis, and to a second distal region 412 of the truss 400.

The truss 400 also includes a bottom chord 416 that extends from the first distal region 414 to the second distal region 412 of the truss 400, and a king post 418 that extends from the peak 405 of the truss 400 to the bottom chord. In some embodiments, the king post 418 may be omitted. Further, in some cases, the bottom chord (and indeed the bottom of the truss) may not extend substantially level or horizontally. For example, the truss 400 may be configured to support a vaulted or cathedral ceiling, in which case the truss may include multiple bottom chords that define the desired shape of the bottom of the truss 400.

The first top chord 404 may extend from the peak 405 to the first distal end 414 of the roof truss and may be connected to the bottom chord 416 (e.g., directly or via a footer or other intermediate structure). The third top chord 408 may extend from the joining region 409 to the second distal end 412 of the roof truss and may be connected to the bottom chord 416 (e.g., directly or via a footer or other intermediate structure). The second top chord 406 may extend from the peak 405 to the joining region 409, where multiple chords and webs may be joined, as shown. In some cases, the second top chord 406 extends to and is connected to the bottom chord 416, where the second top chord 406 is a single member (including the portion 407 in FIG. 4A) that extends from the peak 405 to the bottom chord 416. In other cases, the second top chord 406 terminates at the joining region 409 and the portion 407 is a separate member that is substantially collinear with the upper portion of the second top chord 406.

The peak 405 of the truss 400 may not be at the middle of the overall truss structure. For example, the king post 418, which may extend substantially vertically (or plumb) from the peak 405, may join the bottom chord 416 at a point that is offset from the geometric middle of the bottom chord 416. Thus, the distance 420 from the bottom of the king post 418 to the first distal region 414 of the truss 400 may be smaller than the distance 419 from the bottom of the king post 418 to the second distal region 412 of the truss 400. Described another way, a distance or length from a terminal end of the first top chord 404 (e.g., at the first distal region 414) to the peak 405 may be different than a distance or length from a terminal end of the third top chord 408 (e.g., at the second distal region 412) to the peak 405. For example, as shown in FIG. 4A, the distance from the terminal end of the first top chord 404 to the peak 405 may be less than the distance from the terminal end of the third top chord 408 to the peak 405.

FIG. 4B shows a truss 430 with a similar overall shape to the truss 400 (FIG. 4A). The truss 430 may also be configured to support a roof with a solar-optimized portion as described herein. The truss 430 illustrates another example configuration of webbing that may be used to support the truss, as well as a more symmetrical overall roof shape.

The truss 430 includes a first top chord 434 (which may correspond to and/or define the first portion 104 of the roofs described above). The first top chord 434 may extend from a peak 435 of the roof truss (corresponding to and/or defining the peak 105) to a distal region 444 of the truss 430. The first top chord 434 may extend at a first angle relative to a horizontal axis. The angles of the chords of the trusses may be substantially the same as the angles of the roofs described above, as the chords themselves essentially define the angles of the roof surfaces. Accordingly, for clarity and to avoid repetition, the angles will not be separately identified and discussed with respect to the trusses.

The truss 430 also includes a second top chord 436 (which may correspond to and/or define the second portion 106 of the roofs described above). The second top chord 436 may extend from the peak 435 at a second angle relative to the horizontal axis. The second angle (and thus the pitch of the second top chord 436) may be less than about 90° and different from the first angle (and thus different than the pitch of the first top chord 434). Moreover, as described above, the second angle (and thus the pitch of the second top chord 436) may be selected to optimize the insolation of the portion of the roof defined by the second top chord 436 at a particular geographical latitude of installation of the roof truss 430.

The truss 430 also includes a third top chord 438 (which may correspond to and/or define the third portion 108 of the roofs described above). The third top chord 438 may extend from the second top chord 436 (e.g., from a joining region of the second top chord 436), at a third angle relative to the horizontal axis, and to a second distal region 442 of the truss 430.

The truss 430 also includes a bottom chord 446 that extends from the first distal region 444 to the second distal region 442 of the truss 430. The truss 430 also includes a king post 448 that extends from the peak 435 of the truss 430 to the bottom chord 446. As noted above, the king post 448 and the bottom chord 446 may be omitted or replaced with other members, such as to define a cathedral or vaulted ceiling.

The first top chord 434 may extend from the peak 435 to the first distal end 444 of the roof truss and may be connected to the bottom chord 446 (e.g., directly or via a footer or other intermediate structure). The third top chord 438 may extend from the joining region 439 to the second distal end 442 of the roof truss and may be connected to the bottom chord 446 (e.g., directly or via a footer or other intermediate structure). The second top chord 436 may extend from the peak 435 to the joining region 439, where multiple chords and webs may be joined, as shown. In some cases, the second top chord 436 extends to and is connected to the bottom chord 446, where the second top chord 436 is a single member (including the portion 447 in FIG. 4B) that extends from the peak 435 to the bottom chord 446. In other cases, the second top chord 436 terminates at the joining region 439 and the portion 437 is a separate member that is substantially collinear with the upper portion of the second top chord 436.

Whereas in FIG. 4A, the peak 405 of the truss 400 is not aligned with the middle of the overall truss structure, the peak 435 of the truss 430 is aligned with the middle of the overall truss structure. For example, the king post 448, which may extend substantially vertically (or plumb) from the peak 435, may join the bottom chord 446 at a mid-point of the bottom chord 446 (which may correspond to the middle of the truss 430). Thus, the distance 450 from the bottom of the king post 448 to the first distal region 444 of the truss 430 may be substantially equal to the distance 449 from the bottom of the king post 448 to the second distal region 442 of the truss 400. Described another way, a distance or length from a terminal end of the first top chord 434 (e.g., at the first distal region 444) to the peak 435 may be substantially equal to a distance or length from a terminal end of the third top chord 438 (e.g., at the second distal region 442) to the peak 435.

Trusses having the same exterior shapes as those shown in FIGS. 4A-4B (and indeed any shape conforming to the optimized design described herein) may have different internal constructions. For example, they may include fewer, more, or different internal webs. FIG. 4B, for example, shows how a truss with an exterior configuration in accordance with the solar optimization described herein may have a different web configuration than the similarly optimized truss of FIG. 4A. Other variations to the truss design are also possible without deviating from the inventive concepts described herein. For example, trusses may have overhangs, stub posts, footers, soffit blocks, and the like (or any of these elements may be omitted).

Further, any of the roofs or trusses described herein may be manufactured of any suitable materials and using any suitable techniques. For example, the chords and webs may be wood, metal, composite, or any other suitable material. The chords and webs may be joined to one another using any suitable technique, such as nails, adhesives, connector plates, or any other suitable joining technique. Further, any of the members shown in the figures may be formed of a single member, or multiple members spliced together. For example, the bottom chords in FIGS. 4A-4B may be single wooden members that span the whole length of the truss, or they may be multiple members that are spliced or joined to one another at a point between the distal regions of the truss (e.g., where the kingpost meets the bottom chord).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, subdivided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments.

What is claimed is:

1. A building, comprising:
   a base structure;
   a roof secured to the base structure and comprising:
      a first top chord corresponding to a first planar portion extending from a peak to a first terminal end of the roof and pitched at a first angle relative to a horizontal axis;
      a second top chord corresponding to a second planar portion extending from the peak to a joining region and pitched at a second angle, relative to the horizontal axis, that is optimized for insolation of the second planar portion at a geographical latitude of the building and that is different than the first angle and less than 90 degrees; and
      a third top chord corresponding to a third planar portion extending from the joining region to a second terminal end of the roof and pitched at a third angle relative to the horizontal axis;
      a bottom chord extending from a distal region of the first top chord to a distal region of the third top chord, wherein the second top chord extends from the peak to the bottom chord and is connected to the bottom chord; and
   a solar collector positioned on the second planar portion.

2. The building of claim 1, wherein the solar collector is oriented substantially parallel to the second planar portion.

3. The building of claim 1, wherein the second angle is equal to the geographical latitude of the building.

4. The building of claim 1, wherein a line horizontal to the peak is substantially parallel with a line defining the geographical latitude of the building.

5. The building of claim 1, wherein the solar collector is a photovoltaic panel.

6. The building of claim 1, wherein the solar collector is a solar thermal collector.

7. A roof truss, comprising:
   a first top chord configured to support a first roof portion and extending, from a peak of the roof truss, at a first angle relative to a horizontal axis;
   a second top chord configured to support a second roof portion and extending, from the peak of the roof truss, at a second angle relative to the horizontal axis that is different from the first angle and less than about 90 degrees, wherein the second angle is configured to optimize insolation of the second roof portion at a particular geographical latitude of installation;

a third top chord configured to support a third roof portion and extending from the second top chord at a third angle relative to the horizontal axis; and a bottom chord extending from a distal region of the first top chord to a distal region of the third top chord, wherein the second top chord extends from the peak to the bottom chord and is connected to the bottom chord.

8. The roof truss of claim 7, wherein the second angle is substantially equal to the geographical latitude of installation.

9. The roof truss of claim 7, wherein a first length from a terminal end of the first top chord to the peak is substantially equal to a second length from a terminal end of the third top chord to the peak.

10. The roof truss of claim 7, wherein a first length from a terminal end of the first top chord to the peak is different than a second length from a terminal end of the third top chord to the peak.

11. The roof truss of claim 7, wherein the second angle is substantially equal to the geographical latitude of installation plus or minus 5 degrees.

12. A roof truss comprising:
a first top chord on a first side of a peak and having a first pitch;
a second top chord on a second side of the peak and having a non-vertical second pitch that is different from the first pitch;
a third top chord on the second side of the peak and having a third pitch that is different from the second pitch; and
a bottom chord extending from a distal region of the first top chord to a distal region of the third top chord,
wherein the second top chord extends from the peak to the bottom chord and is connected to the bottom chord.

13. The roof truss of claim 12, wherein the non-vertical second pitch is characterized by an angle that is substantially equal to a geographical latitude of installation of the roof truss.

14. The roof truss of claim 12, wherein:
the first top chord and the second top chord join at a peak of the roof truss; and
the roof truss further comprises:
a king post extending from the peak of the roof truss to the bottom chord.

15. The roof truss of claim 12, wherein the first, second, and third top chords are formed from wood.

16. The roof truss of claim 12, wherein the first pitch and the third pitch are substantially equal.

17. The roof truss of claim 12, wherein:
the second top chord at least partially defines a first exterior roof segment having a first length; and
the third top chord at least partially defines a second exterior roof segment having a second length that is at least twice as long as the first exterior roof segment.

18. The roof truss of claim 12, wherein:
the roof truss defines part of a roof of a building that is located at a particular geographical latitude; and
the second pitch is selected, based on the geographical latitude, to maximize insolation of a roof segment supported by the second top chord.

* * * * *